(12) United States Patent
McLean

(10) Patent No.: US 6,431,825 B1
(45) Date of Patent: Aug. 13, 2002

(54) SEAL BETWEEN STATIC TURBINE PARTS

(75) Inventor: Howard Jones McLean, North Palm Beach, FL (US)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/628,328

(22) Filed: Jul. 28, 2000

(51) Int. Cl.⁷ ............................ F01D 25/26; F16J 15/02
(52) U.S. Cl. ........................................ 415/135; 277/644
(58) Field of Search ................................. 277/643, 644, 277/647, 648, 649, 654; 415/135

(56) References Cited

U.S. PATENT DOCUMENTS

| | | | | |
|---|---|---|---|---|
| 3,975,114 A | * | 8/1976 | Kalkbrenner | 415/136 X |
| 4,396,199 A | * | 8/1983 | Boyd et al. | 277/644 X |
| 5,125,796 A | * | 6/1992 | Cromer | 277/644 X |
| 5,127,799 A | | 7/1992 | Berry | |
| 5,634,766 A | | 6/1997 | Cunha et al. | |
| 5,743,708 A | | 4/1998 | Cunha et al. | |
| 5,865,600 A | * | 2/1999 | Mori et al. | 277/649 X |
| 5,868,398 A | | 2/1999 | Maier et al. | 277/643 |
| 6,193,240 B1 | * | 2/2001 | Johnson et al. | 277/643 |
| 6,199,871 B1 | * | 3/2001 | Lampes | 277/644 X |

FOREIGN PATENT DOCUMENTS

| | | |
|---|---|---|
| DE | 29 18 996 | 2/1980 |
| JP | 58-32906 | 2/1983 |
| JP | 09393107 | 11/1997 |

\* cited by examiner

*Primary Examiner*—John E. Ryznic
(74) *Attorney, Agent, or Firm*—Burns, Doane, Swecker & Mathis, L.L.P.

(57) ABSTRACT

A seal between two static turbine parts is provided with a carrier piece comprising a flat metal piece with a middle piece and end pieces each of which is arranged in a groove in the static turbine parts. A second part comprising a flat metal piece and having a middle piece and end pieces which are also arranged in grooves is attached to the middle piece of the carrier. The end pieces are constructed resiliently, ensuring a sealing contact between the end pieces and the inside surfaces of the grooves even in the case of a relative shift of the grooves. The seal does not depend on the level of a pressure differential.

9 Claims, 2 Drawing Sheets

SEAL BETWEEN STATIC TURBINE PARTS

FIELD OF THE INVENTION

The invention relates to a seal between static parts of a turbine.

BACKGROUND OF THE INVENTION

Such seals are used primarily in gas turbines. They are used as seals between static parts of the turbine, for example in cooling air paths of guide vanes, between the individual segments of a series of guide vanes, or as a circumferential seal between a housing part of the turbine and a guide vane.

This type of seal is described for example in U.S. Pat. No. 5,743,708, and is shown in particular in FIGS. 17 and 18 of this document. The seal in this case consists of a flat metal piece provided on each of two opposite sides with a solid bead. When viewed as a cross-section, the seal has a long, narrow middle piece, which at each of its ends has a round bead. Because of its cross-section, it is called a "dog bone seal". In the first series of guide vanes, it is located in each case between adjoining guide vane platforms, and functions there as a seal for cooling air paths in order to cool the outside and inside platforms of the guide vanes.

Each of the individual solid, round beads is located in a groove of adjoining guide vane platforms, whereby these beads rest snugly against the inside surfaces of the grooves. Each of the seals extends over the lateral length of a platform. The seal is achieved primarily by a pressure differential, whereby the seal occurs along lines on the lateral surfaces of the grooves where the rounded beads contact the flat inside surfaces of the grooves. A seal hereby must be ensured by the beads in both grooves.

A variation of this type of seal, a so-called "dog bone seal" is disclosed in U.S. Pat. No. 5,868,398. It also functions as a seal between adjoining guide vane segments in this case. However, the bead at the sides of the seal is not constructed in a solid manner, but is realized by a curvature of the flat metal piece, whereby the curved parts are set into a groove.

Another variation of this seal is a circumferential seal, for example, for sealing the rotor hood of the turbine against the first guide vane series in order to create a seal between cooling air and hot gas.

In this seal, the flat metal piece has the form of a ring provided at its radially inward and its radially outward side with a bead. Each of the static parts is provided with a groove in which the beads are arranged. The metal ring of these seals consists of at least two parts, for example, two 180° parts, which seal against the lower or respectively upper half of the turbine. The beads contact the insides of the grooves along an arched line extending over 180°.

These seals have the disadvantage that in the absence of an adequate pressure differential, there is an insufficient contact of the beads, resulting in a leak. Furthermore, the seal is not fully ensured if one or both static parts of the turbine shift axially, and the grooves shift relative to each other. In this case, a crescent-shaped space is created along each of the two 180° segments between a groove and the bead located inside it, resulting in a leak. In order to prevent such leaks resulting from a relative shifting of the grooves, the seals may be realized in several shorter ring segments, for example. In this case, the contact line between beads and groove surfaces is always an almost straight line instead of a curved line. This makes it possible that the seal is able to rock back and forth inside the grooves, and if the grooves shift, the seal is able to move with them, whereby a continued contact, i.e. the seal, is ensured along the straight line. However, leaks may occur at the joints between the individual ring segments so that overall improvement of the seal is questionable.

SUMMARY OF THE INVENTION

In view of the cited disadvantages of the initially described seal, the invention is based on the objective of creating a seal of this type between static parts of a turbine, said seal ensuring a sufficient seal at all times, with this seal resulting not exclusively from a pressure differential, and where said seal retains its sealing effect during a relative shifting of the static parts.

A seal between static parts of a turbine is provided with a first carrier piece comprising a flat metal piece, having a middle piece and two end pieces, whereby said end pieces are arranged at opposite sides of the carrier piece, and where each of said end pieces extends over the entire lateral length. The carrier piece extends over the space to be sealed between the static parts of the turbine, whereby each of the end pieces is arranged in grooves inside the static parts. According to the invention, the seal has a second part comprising a flat metal piece arranged parallel to the carrier piece and attached to the carrier piece. It also has a middle piece and two end pieces, whereby its end pieces are also arranged in the grooves on the static turbine parts. Hereby at least one end piece in each groove is constructed in a resilient manner, i.e. either the end piece of the carrier piece or of the second part, or both. Each of the resilient end pieces is force-fitted in the grooves.

The resilient characteristic of the end pieces causes the latter to be snugly force-fitted against the surfaces of the grooves, resulting in a seal along the contact line between end pieces and grooves. The forced contact and seal are substantially independent from a pressure differential. The resilient characteristic furthermore has the result that, in the case of a shifting of the grooves relative to each other, the end pieces continue to rest against the groove surfaces in a force-fitted manner along contact lines. As a result no spaces form between grooves and end pieces and a seal is ensured even if the static parts shift.

In a first embodiment of the seal according the invention, the end pieces of both the carrier piece as well as the end pieces of the second part are designed in a rounded and hook-shaped manner, whereby the inside of the hook shape of the end pieces on the carrier piece faces the second part, and the inside of the curvature of the hook shape of the end pieces of the second part faces the carrier piece. The hooks of the end pieces of both parts therefore run towards each other. Hereby their length is such that they extend inside each other.

In a preferred embodiment, the flat metal piece of the second part is constructed thinner than that of the carrier piece. This increases the resilient effect of the end pieces of the second part. Depending on the application and extent of the expected relative shifting of the grooves, the thickness of the metal piece for the second part can be chosen so the necessary resilient effect is achieved.

In this first embodiment, a carrier piece consists of two ring segments of 180° each. The second part in each case consists of several short ring segments that are attached along the carrier piece.

In a variation, the second part also consists of two ring segments of 180° each. In yet another variation, the carrier piece as well as the second part consists of several short ring segments.

In a further preferred embodiment, the second part is attached at the carrier piece in a slightly offset manner so that it projects beyond the edge of the carrier piece and overlaps the adjoining carrier piece at the joint between the ring segments. This prevents a leak at the joints.

In a variation of this embodiment, the ring segments of the seal have the circumferential length of a single guide vane platform, for example, in its application for sealing the space between guide vane platforms and the inner housing. In the case of short segments, the contact lines between end pieces and grooves are straight. This makes it possible that in case of a relative shifting of the grooves the sealing ring segments are able to rock back and forth within theses grooves, and a contact and seal is maintained. In order to achieve a seal between the individual ring segments, the carrier pieces in this case are constructed so that they overlap each other at the joints.

In a second embodiment of the invention, a carrier piece consists of a seal with middle piece and end pieces, whereby the end pieces are solid beads. The second part of the seal consists of a flat metal piece that is provided at its sides with end pieces constructed in a resilient manner. Each of the resilient end pieces is constructed in an acutely angled roof shape. The tip of these end pieces in each case touches the insides of the grooves, forming the seal. In a variation, the resilient end pieces are also constructed in hook shape here. Depending on the extent of the shifting of the grooves and on the properties of the grooves, the size of the segments of the carrier piece and of the second part of the seal have been chosen accordingly here also.

BRIEF DESCRIPTION OF THE DRAWINGS

Preferred embodiments of the invention are shown in the accompanying drawings, in which.

DETAILED DESCRIPTION OF THE INVENTION

Figure 1:
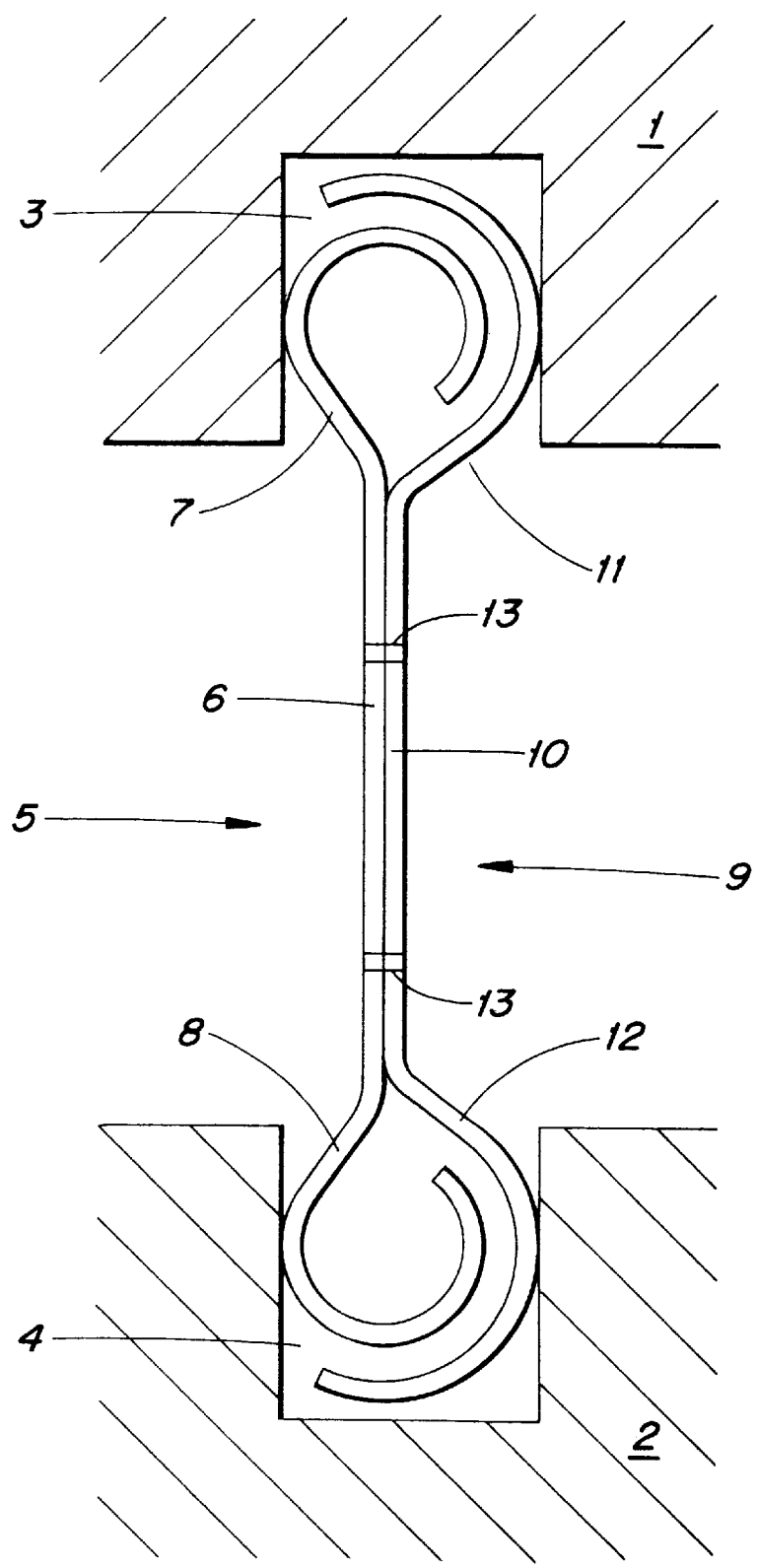
FIG. 1 shows a cross section through a seal of the first embodiment according to the invention, having a carrier piece and a second part, whereby the end pieces of the carrier piece and the second part have the shape of hooks extending inside each other.

FIG. 1 shows the first embodiment of the seal according to the invention. It is used, for example, in a gas turbine, between the inside housing and the first guide vane series. It also can be used in other place of a gas turbine, where parts must be sealed simultaneously in the presence of a radial and axial offset.

FIG. 1 shows two static parts 1 and 2 of a turbine extending for example, over the top half or the bottom half of the turbine. Both parts are provided with circumferential grooves 3 or respectively 4 in which the seal according to the invention is arranged. The seal is provided with a carrier piece 5 comprising a flat metal piece in the shape of two ring segments of 180° each. The middle piece 6 of the carrier piece extends radially over the space to be sealed between the two static parts 1 and 2. The middle piece 6 of both ring segments is provided at its radially inward and radially outward side with end pieces 7 and 8 having a round, resilient hook shape.

A second part 9 of the seal is connected to the carrier piece 5. The latter is attached in the area of its middle piece 10 by rivets 13 or by welds 13, which weld the middle piece 6 of the carrier piece 5. The second part 9 principally has the same shape as the carrier piece 5. It also consists of a flat metal piece, which consists, for example, also of two ring segments of 180° each.

At its radially inward and radially outward sides of the ring segments, the second part also has end pieces 11 and 12, which have a round, resilient hook shape. The inside of the hook shape of the carrier piece 5 and the one of the second part 9 face each other. The end pieces 7, 8, 11, 12 hereby extend inside other and at least partially overlap each other.

As a result of their resilient characteristic, the hook-shaped end pieces 7, 8, 11, 12 enable a force-fit inside the grooves, ensuring even without a pressure differential a sealing contact between end pieces and groove surfaces.

The thickness of the metal piece for the second part is the same here as for the carrier piece. But the thickness also could be selected smaller in order to achieve a greater resilience. This is desirable in the case of larger relative shifts of the grooves in order to prevent the formation of spaces in the grooves as much as possible.

By using the resilient end pieces, a seal is ensured even if the grooves shift. But if these shifts are very large, or if the inside surfaces of the grooves are irregular, as is the case, for example, when using the seal for guide vane platforms, a reliable seal is achieved with a greater segmentation of both parts. It is possible that either only the second part or both parts, carrier piece, as well as the second part are realized in shorter ring segments. In this case, the contact line at the groove surfaces are lines, and the seal is able to rock back and forth within the grooves and move along with the shifting of the grooves.

Figure 2:
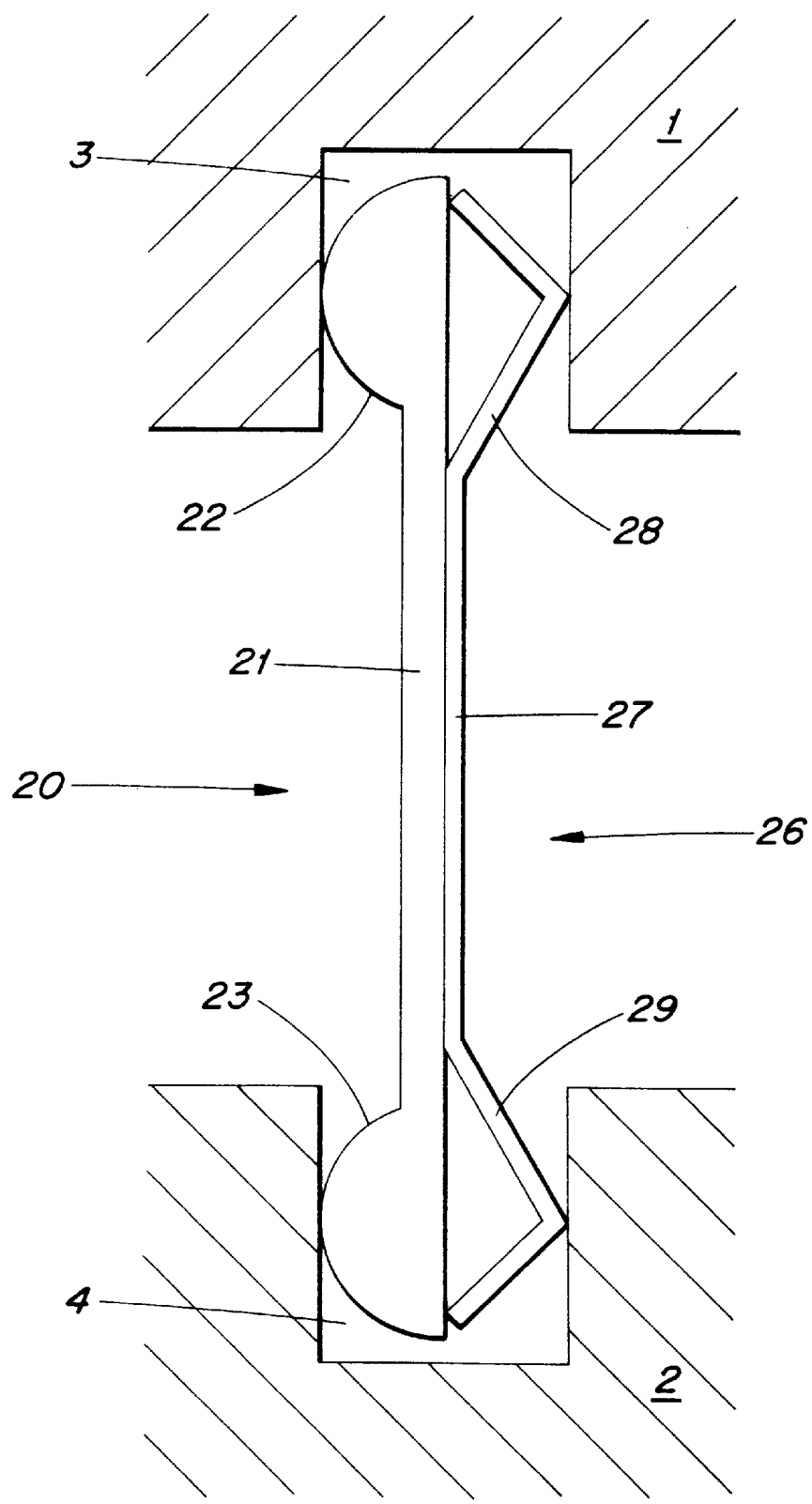
FIG. 2 shows a cross section through a seal according to the invention of the second embodiment, having solid beads at the carrier piece and acutely angled roof-shaped end pieces on the second part of the seal.

In the case of very large relative shifts or if the extent of shifting is unknown, a seal according to the invention as shown in FIG. 2 can be used. The carrier piece 20 again consists of a flat metal piece with a middle piece 21 and two end pieces 22 and 23 located inside grooves 3 and 4. The end pieces 22 and 23 hereby resemble the known "dog bone seals" in that they are solid. In this case, they are semi-circular, for example. In the area of the middle piece 21 of the carrier piece 20, a second part 26 of a flat metal piece is attached. This metal piece 27 extends parallel to the middle piece of the carrier piece. Its end pieces 28 and 29 here have the shape of an acutely angled roof which rests resiliently against the inside surfaces of grooves 3 and 4. In order to avoid leaks at the joints between the individual ring segments of the seal, the carrier pieces, for example, are constructed so that they overlap each other at the joints. In a variation, the second parts each are attached offset in relation to the carrier pieces, in this way achieving an overlap.

What is claimed is:

1. A seal for sealing between static parts of a turbine having opposed grooves, the seal comprising: a carrier piece in the form of a flat metal piece having a first middle piece and having first end pieces at opposite ends of the first middle piece, whereby the end pieces are each arranged in a groove in the static turbine parts and are adjoining the inside faces of the grooves, a second seal part in the form of a flat metal piece having a second middle piece and having second end pieces at opposite ends of the second middle piece, whereby the middle piece of the second seal part is arranged in parallel to the middle piece of the carrier piece and fastened to the middle piece of the carrier piece and the end pieces of the second seal part are arranged in the grooves of the static turbine parts, the middle piece of the carrier piece and the middle piece of the second part of the seal extends between two static parts of the turbine, the end pieces of at least one of the carrier piece and the second seal part has a resilient shape, whereby the resilient end piece is adapted to provide an interference fit in a groove in a turbine static part, wherein the end parts of the carrier pieces are constructed solidly, and the end parts of the second part are constructed resiliently.

2. The seal as in claimed 1, wherein the end parts of the second part are constructed in the shape of an acutely angled roof or in hook shape.

3. A seal for sealing between static parts of a turbine having opposed grooves, the seal comprising: a carrier piece in the form of a flat metal piece having a first middle piece and having first end pieces at opposite ends of the first middle piece, whereby the end pieces are each arranged in a groove in the static turbine parts and are adjoining the inside faces of the grooves, a second seal part in the form of a flat metal piece having a second middle piece and having second end pieces at opposite ends of the second middle piece, whereby the middle piece of the second seal part is arranged in parallel to the middle piece of the carrier piece and fastened to the middle piece of the carrier piece and the end pieces of the second seal part are arranged in the grooves of the static turbine parts, the middle piece of the carrier piece and the middle piece of the second part of the seal extends between two static parts of the turbine, the end pieces of at least one of the carrier piece and the second seal part has a resilient shape, whereby the resilient end piece is adapted to provide an interference fit in a groove in a turbine static part, wherein the end pieces of the carrier piece and the end pieces of the second piece are constructed resiliently, and the end pieces of the carrier piece and the end pieces of the second part are constructed in a curved and hook-shaped manner, whereby the hook shape is rounded, and the insides of the rounded hook shape of the end pieces of the carrier piece face the insides of the rounded hook shape of the end pieces of the second part, wherein the carrier piece of the seal comprises two ring segments of 180° each, and the second part comprises several ring segments smaller than 180°.

4. The seal as claimed in claim 3, wherein the thickness of the flat metal piece of the second part is smaller than the thickness of the flat metal piece of the carrier piece.

5. The seal as claimed in claim 3, wherein the ring segments of the carrier piece overlap each other at the joints between the individual ring segments, or the second parts are attached offset to the carrier pieces in such a manner that they overlap the carrier pieces at the joints.

6. A seal for sealing between static parts of a turbine having opposed grooves, the seal comprising: a carrier piece in the form of a flat metal piece having a first middle piece and having first end pieces at opposite ends of the first middle piece, whereby the end pieces are each arranged in a groove in the static turbine parts and are adjoining the inside faces of the grooves, a second seal part in the form of a flat metal piece having a second middle piece and having second end pieces at opposite ends of the second middle piece, whereby the middle piece of the second seal part is arranged in parallel to the middle piece of the carrier piece and fastened to the middle piece of the carrier piece and the end pieces of the second seal part are arranged in the grooves of the static turbine parts, the middle piece of the carrier piece and the middle piece of the second part of the seal extends between two static parts of the turbine, the end pieces of at least one of the carrier piece and the second seal part has a resilient shape, whereby the resilient end piece is adapted to provide an interference fit in a groove in a turbine static part, wherein the end pieces of the carrier piece and the end pieces of the second piece are constructed resiliently, and the end pieces of the carrier piece and the end pieces of the second part are constructed in a curved and hook-shaped manner, whereby the hook shape is rounded, and the insides of the rounded hook shape of the end pieces of the carrier piece face the insides of the rounded hook shape of the end pieces of the second part, wherein the carrier piece and the second part of the seal comprise two ring segments of 180° each.

7. The seal as claimed in claim 6, wherein the thickness of the flat metal piece of the second part is smaller than the thickness of the flat metal piece of the carrier piece.

8. A seal for sealing between static parts of a turbine having opposed grooves, the seal comprising: a carrier piece in the form of a flat metal piece having a first middle piece and having first end pieces at opposite ends of the first middle piece, whereby the end pieces are each arranged in a groove in the static turbine parts and are adjoining the inside faces of the grooves, a second seal part in the form of a flat metal piece having a second middle piece and having second end pieces at opposite ends of the second middle piece, whereby the middle piece of the second seal part is arranged in parallel to the middle piece of the carrier piece and fastened to the middle piece of the carrier piece and the end pieces of the second seal part are arranged in the grooves of the static turbine parts, the middle piece of the carrier piece and the middle piece of the second part of the seal extends between two static parts of the turbine, the end pieces of at least one of the carrier piece and the second seal part has a resilient shape, whereby the resilient end piece is adapted to provide an interference fit in a groove in a turbine static part, wherein the end pieces of the carrier piece and the end pieces of the second piece are constructed resiliently, and the end pieces of the carrier piece and the end pieces of the second part are constructed in a curved and hook-shaped manner, whereby the hook shape is rounded, and the insides of the rounded hook shape of the end pieces of the carrier piece face the insides of the rounded hook shape of the end pieces of the second part, wherein the carrier piece and the second part of the seal comprise several ring segments smaller than 180°.

9. The seal as claimed in claim 8, wherein the thickness of the flat metal piece of the second part is smaller than the thickness of the flat metal piece of the carrier piece.

* * * * *